United States Patent
Nomura

(10) Patent No.: US 8,180,934 B2
(45) Date of Patent: May 15, 2012

(54) DEVICE MONITORING APPARATUS, CONTROL METHOD THEREFOR, DEVICE MONITORING SYSTEM, AND RECORDING MEDIUM

(75) Inventor: Yoshihisa Nomura, Yokohama (JP)

(73) Assignee: Canon Kabushiki Kaisha (JP)

( * ) Notice: Subject to any disclaimer, the term of this patent is extended or adjusted under 35 U.S.C. 154(b) by 182 days.

(21) Appl. No.: 12/420,875

(22) Filed: Apr. 9, 2009

(65) Prior Publication Data

US 2009/0287855 A1 Nov. 19, 2009

(30) Foreign Application Priority Data

May 14, 2008 (JP) ................. 2008-127390

(51) Int. Cl.
*G06F 3/00* (2006.01)
(52) U.S. Cl. ........... 710/19; 710/14; 710/15; 710/16; 710/17; 710/18; 709/223; 709/224; 713/300; 713/310; 713/320
(58) Field of Classification Search .......... 710/14–19; 709/223, 224, 232, 208; 713/320, 310, 300
See application file for complete search history.

(56) References Cited

U.S. PATENT DOCUMENTS

| 5,913,067 | A  | * | 6/1999  | Klein    | 713/300 |
| 5,915,119 | A  | * | 6/1999  | Cone     | 713/310 |
| 6,807,907 | B2 | * | 10/2004 | Yamada   | 358/1.15 |
| 7,330,986 | B2 | * | 2/2008  | Cheshire | 713/320 |
| 7,480,729 | B2 | * | 1/2009  | Fujihara | 709/232 |
| 7,716,318 | B2 | * | 5/2010  | Kaneko   | 709/223 |
| 7,757,108 | B2 | * | 7/2010  | Cheshire | 713/320 |
| 7,805,493 | B2 | * | 9/2010  | Nishio   | 709/208 |

FOREIGN PATENT DOCUMENTS

| JP | 2000-103148 | A |   | 4/2000 |
| JP | 2002-247062 |   | * | 8/2002 |
| JP | 2006-215686 | A |   | 8/2006 |

* cited by examiner

*Primary Examiner* — Tammara Peyton
(74) *Attorney, Agent, or Firm* — Rossi, Kimms & McDowell LLP

(57) ABSTRACT

A device monitoring apparatus capable of effectively reducing load on and power consumption of a device monitoring system, even if there is a device not having a function of notifying restoration from a sleep state. When all of monitored object devices are brought in a simple polling state, a controller of the device monitoring apparatus determines that load on the controller becomes smaller and stops polling the monitored object devices. Instead, a LAN controller, which performs processing simpler than that of the controller, carries out simple polling simpler than normal polling.

11 Claims, 11 Drawing Sheets

| MONITORED OBJECT DEVICE | IP ADDRESS | MAC ADDRESS | STATE LEVEL |
|---|---|---|---|
| SFP31 | 192.168.0.100 | 00-00-39-1E-80-A7 | NORMAL POLLING (RESPONDABLE) |
| SFP32 | 192.168.0.101 | 00-00-40-3B-09-C5 | SIMPLE POLLING (UNRESPONDABLE) |

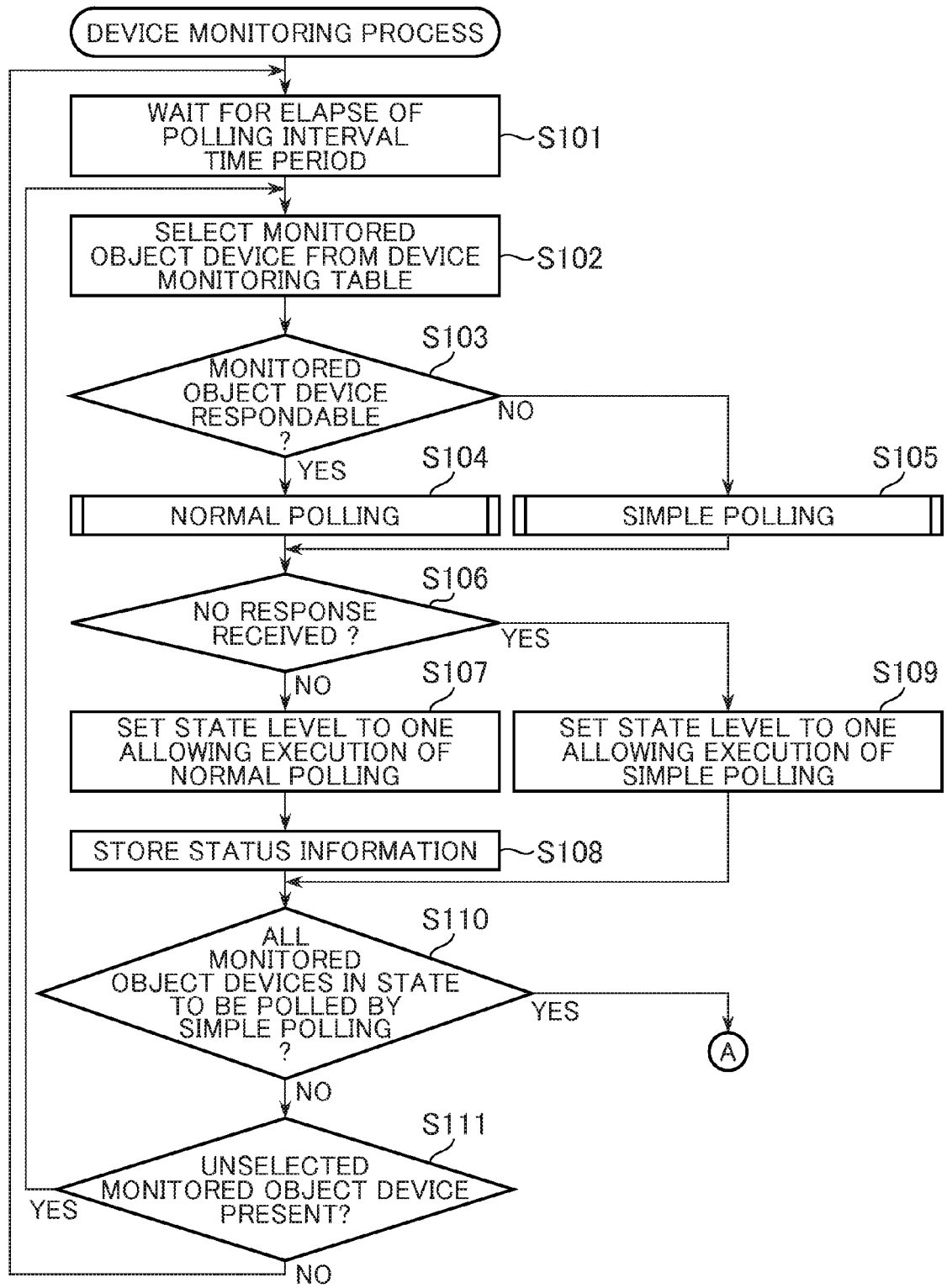

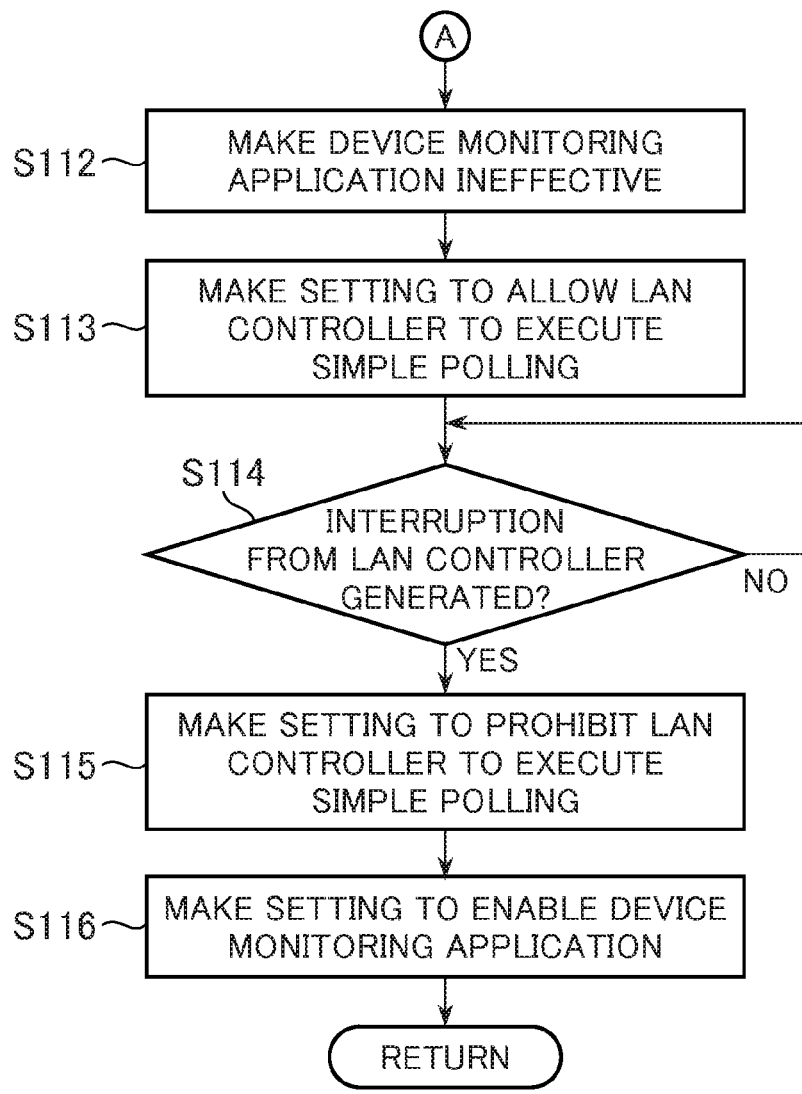
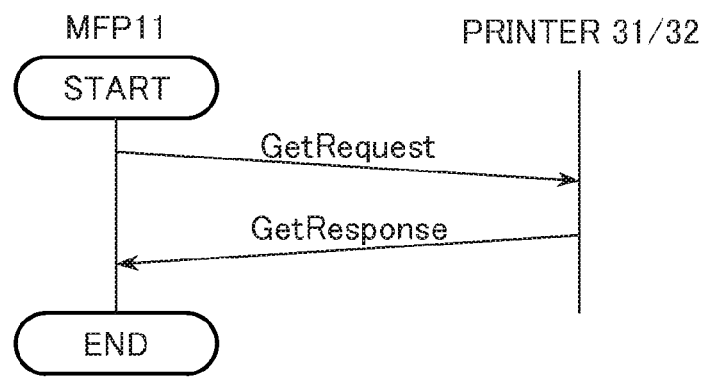

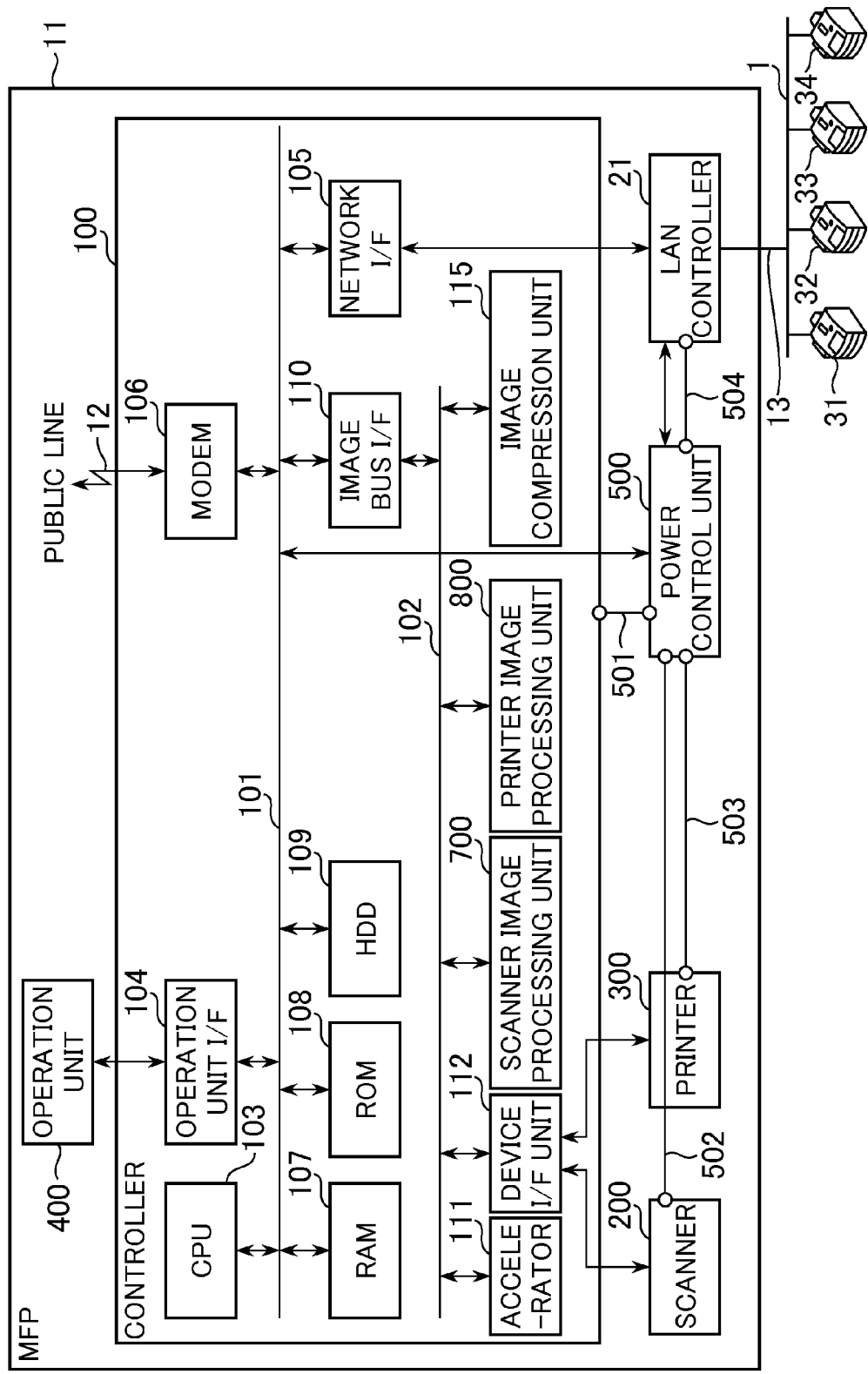

FIG. 11A

| DEVICE MONITORING TABLE | | | | |
|---|---|---|---|---|
| MONITORED OBJECT DEVICE | IP ADDRESS | MAC ADDRESS | SIMPLE POLLING OBJECT DEVICE | STATE LEVEL |
| SFP31 | 192.168.0.100 | 00-00-39-1E-80-A7 | ○ | 1 |
| SFP32 | 192.168.0.101 | 00-00-40-3B-09-C5 | ○ | 2 |
| SFP33 | 192.168.0.102 | 00-00-21-18-49-76 | × | 3 |
| SFP34 | 192.168.0.103 | 00-00-98-21-AB-97 | × | 3 |

FIG. 11B

| STATE LEVEL | STATE |
|---|---|
| 1 | ACTIVATION STATE |
| 2 | SIMPLE POLLING |
| 3 | SIMPLE POLLING PRECLUDED |

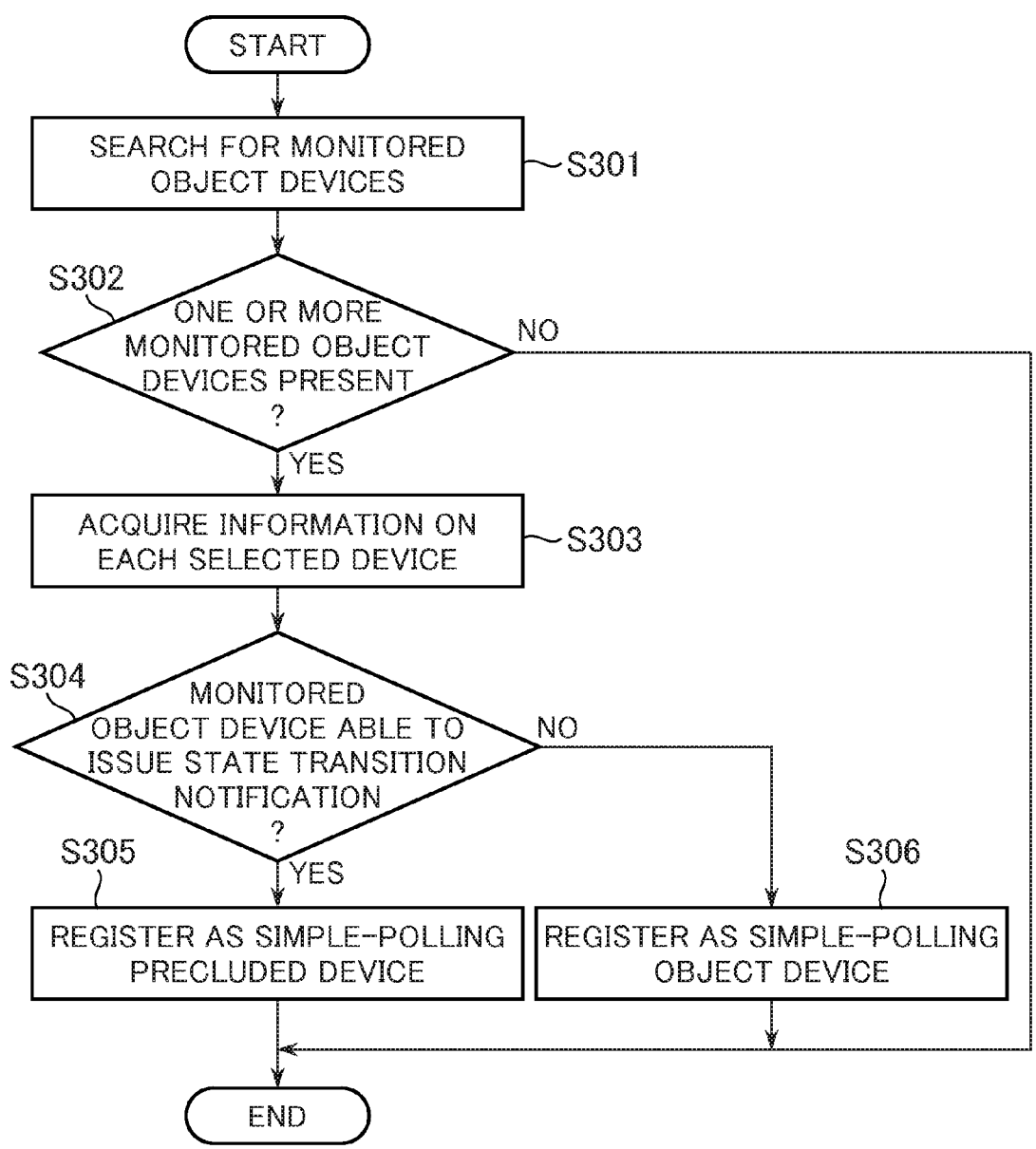

DEVICE MONITORING APPARATUS, CONTROL METHOD THEREFOR, DEVICE MONITORING SYSTEM, AND RECORDING MEDIUM

BACKGROUND OF THE INVENTION

1. Field of the Invention

The present invention relates to a device monitoring apparatus that monitors devices on a network such as a copier and a printer, a control method for the device monitoring apparatus, a device monitoring system that includes the device monitoring apparatus, and a recording medium that stores a program for realizing the control method.

2. Description of the Related Art

Conventionally, a system has generally been known that monitors a change in the state of devices such as a copier and a printer on a network. A system of this type includes a monitoring device that performs monitoring (hereinafter referred to as the master unit). The master unit transmits to devices as monitored objects (hereinafter referred to as the slave units) on the network a request for acquisition of information at regular intervals of time in order to inspect the states of the slave units. In a case for example that the slave unit is a copier, when a request for acquisition of information on operation state, setting information on toner amount, sheet feed cassette, etc., error information on print sheet jam, out of print sheets, etc., is transmitted from the master unit, the slave unit sends the requested information back to the master unit.

Thus, the master unit grasps the state of the slave unit. When, for example, an error occurs in the slave unit to be monitored, the master unit transmits an e-mail to a manager or displays a notification on a monitor, whereby the device monitoring is achieved.

In the above monitoring system, after the slave unit shifts into a sleep state (a mode the slave unit enters when not operated for a given time period or more) or into a power-off state, the state of the slave unit does not change and therefore the monitoring is no longer necessary. In that case, it is preferable to properly control power supply to a system controller of the master unit that performs the device monitoring, in order to reduce power consumption.

To this end, there has conventionally been proposed a technique in which the master unit stops transmitting the information acquisition request for the device monitoring in response to a notification of transition to the sleep state being transmitted from the slave unit, and resumes the device monitoring when the slave unit returns from the sleep state (see, for example, Japanese Laid-open Patent Publication No. 2000-103148). Also proposed is a technique in which the interval at which the information acquisition request is transmitted for the device monitoring is made longer in accordance with the state of the slave unit (see, for example, Japanese Laid-open Patent Publication No. 2006-215686), thereby reducing load on the master unit and achieving a reduction in power consumption.

However, with the technique disclosed in Japanese Laid-open Patent Publication No. 2000-103148, the master unit cannot stop transmitting the information acquisition request in a case where the slave unit is not provided with means for notifying the return from the sleep state. Usually, after the slave unit shifts into the sleep state or the power-off state, the slave unit does not respond to the information acquisition request from the master unit. In that case, the master unit cannot detect on the network that the slave unit returns from the sleep state or shifts into the power-on state. Therefore, in order to monitor a change in the state of the slave unit (returning from the sleep state or turning-on of power), the master unit must transmit the information acquisition request even when the slave unit is in the sleep state or in the power-off state.

With the technique disclosed in Japanese Laid-open Patent Publication No. 2006-215686, even if the interval at which the information acquisition request is transmitted for monitoring the slave unit is made longer, a large load is applied to the master unit at intervals of a given time period in the case of large-scaled master unit, resulting in a problem that the power consumption for the monitoring cannot effectively be reduced.

SUMMARY OF THE INVENTION

The present invention provides a device monitoring apparatus capable of effectively reducing load on and power consumption of a device monitoring system, even if the system includes a device not provided with notification means that notifies about return from a sleep state, and also provides a control method for the device monitoring apparatus, a device monitoring system, and a recording medium storing a program for executing the control method.

According to a first aspect of this invention, there is a device monitoring apparatus that transmits a first information acquisition request to one or a plurality of devices on a network and monitors a state of each of the one or plurality of devices based on a response therefrom, comprising a determination unit adapted to determine a state of at least one device to be monitored, a setting unit adapted, when the determination unit determines that the at least one device to be monitored is in a particular state, to make setting to stop the first information acquisition request from being transmitted to the at least one device and cause a processing apparatus on the network to start transmitting to the at least one device a second information acquisition request to acquire information more limited than information acquired by transmission of the first information acquisition request, and a control unit adapted, in a case where the control unit receives from the processing apparatus an interruption notification based on a response from any one of the at least one device in reply to transmission of the second information acquisition request after the setting is made by the setting unit, to cause the processing apparatus to stop transmitting the second information acquisition request to the one of the at least one device and to restart transmitting the first information acquisition request to the one of the at least one device.

According to a second aspect of this invention, there is provided a device monitoring apparatus that transmits a first information acquisition request to one or a plurality of first devices on a network and to one or a plurality of second devices on the network, each of the one or plurality of second devices being able to notify a state change occurring therein to an external apparatus, and monitors a state change in each of the first and second devices based on responses from the first and second devices, comprising a determination unit adapted to determine whether or not there is a change in state of at least one first device to be monitored, a reception unit adapted to receive a state change notification from at least one second device to be monitored, a setting unit adapted, in a case where the determination unit determines that there is no change in state of the at least one first device to be monitored and receives from the at least one second device to be monitored a notification, as the state change notification, that the at least one second device to be monitored changes to a particular state, to make setting to stop the first information acquisition request from being transmitted to the first and second devices and cause a processing apparatus on the network to start transmitting to the first device a second information acquisition request to acquire information more limited than information acquired by transmission of the first information acquisition request, and a control unit adapted, in a case where the control unit receives an interruption notification from the processing apparatus after the setting is made by the setting unit, to cause the processing apparatus to stop transmitting the second information acquisition request to the first device and to restart transmitting the first information acquisition request to the first and second devices.

According to a third aspect of this invention, there is provided a device monitoring system in which an information acquisition request is transmitted from a first device monitoring apparatus or a second device monitoring apparatus on a network to one or a plurality of devices on the network, and each of the one or plurality of devices is monitored based on a response therefrom, wherein the first device monitoring apparatus comprises a determination unit adapted to determine a state of at least one device to be monitored, a setting unit adapted, when the determination unit determines that the at least one device to be monitored is in a particular state, to make setting to stop a first information acquisition request from being transmitted to the at least one device and cause the second device monitoring apparatus to start transmitting to the at least one device a second information acquisition request to acquire information more limited than information acquired by transmission of the first information acquisition request, and a control unit adapted, in a case where the control unit receives an interruption notification from the second device monitoring apparatus after the setting is made by the setting unit, to control the second device monitoring apparatus to stop transmitting the second information acquisition request to the at least one device and to restart transmitting the first information acquisition request to the at least one device, and wherein the second device monitoring apparatus comprises a unit adapted to transmit the second information acquisition request to the at least one device in accordance with an instruction from the first device monitoring apparatus according to the setting by the setting unit and adapted to issue the interruption notification to at least the first device monitoring apparatus when detecting a state change in the at least one device from a response from the at least one device.

According to a fourth aspect of this invention, there is provided a control method for a device monitoring apparatus that transmits a first information acquisition request to one or a plurality of devices on a network and monitors a state of each of the one or plurality of devices based on a response therefrom, the control method comprising a determination step of determining a state of at least one device to be monitored, a setting step of making setting to stop the first information acquisition request from being transmitted to the at least one device and cause a processing apparatus on the network to start transmitting to the at least one device a second information acquisition request to acquire information more limited than information acquired by transmission of the first information acquisition request when it is determined in the determination step that the at least one device to be monitored is in a particular state, and a control step of, in a case where an interruption notification based on a response from any one of the at least one device is received from the processing apparatus in reply to transmission of the second information acquisition request after the setting is made in the setting step, causing the processing apparatus to stop transmitting the second information acquisition request to the one of the at least one device and restarting transmission of the first information acquisition request to the one of the at least one device.

According to a fifth aspect of this invention, there is provided a computer-readable recording medium storing a program for causing a computer to execute the control method according to the fourth aspect of this invention.

According to this invention, it is possible to effectively reduce load on and power consumption of the device monitoring system.

Further features of the present invention will become apparent from the following description of exemplary embodiments with reference to the attached drawings.

BRIEF DESCRIPTION OF THE DRAWINGS

FIG. 5 is part of a flowchart showing a device monitoring process implemented by a first device monitoring apparatus of the first embodiment;

FIG. 6 is the remaining part of the flowchart, which follows the part shown in FIG. 5;

FIG. 7 is a sequence diagram showing communication between the device monitoring apparatus and a monitored object device at simple polling;

FIG. 10 is a block diagram showing an example construction of a device monitoring system according to a second embodiment;

FIG. 11A is a tabulated diagram showing a device monitoring table of the second embodiment, and FIG. 11B is a tabulated diagram showing a relation between state levels in the device monitoring table and states of monitored object devices;

FIG. 12 is a flowchart showing a monitored object setting process implemented by a first device monitoring apparatus according to the second embodiment;

DETAILED DESCRIPTION OF THE PREFERRED EMBODIMENTS

The present invention will now be described in detail below with reference to the drawings showing preferred embodiments thereof.

First Embodiment

Construction of a Device Monitoring System

Figure 1:
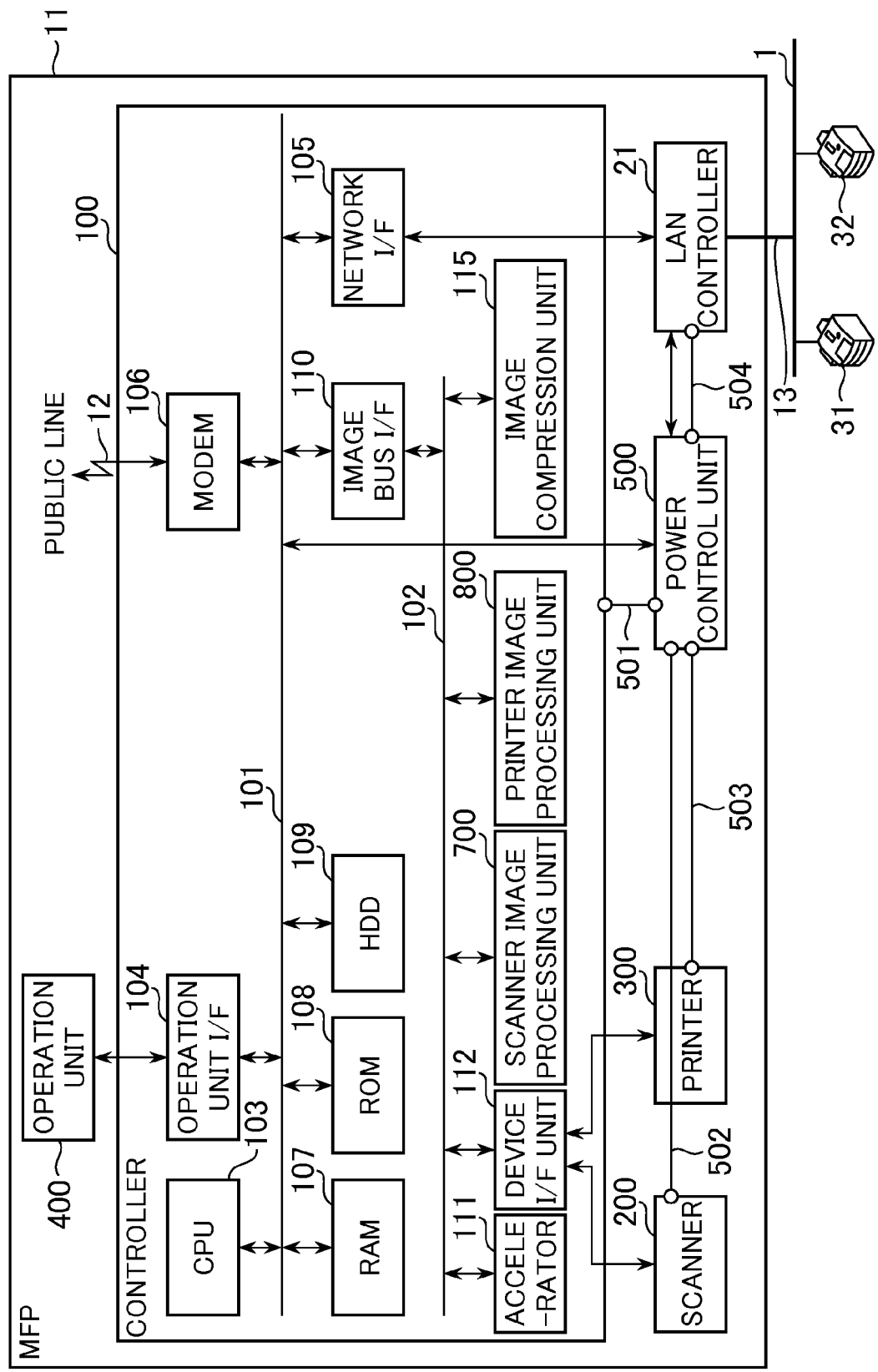
FIG. 1 is a block diagram showing an example construction of a device monitoring system including device monitoring apparatuses according to a first embodiment.

FIG. 1 shows in block diagram an example construction of a device monitoring system including device monitoring apparatuses according to a first embodiment of this invention.

The device monitoring system includes a controller 100 incorporated in an MFP 11, an LAN controller 21 incorporated in the MFP 11, and printers (SFPs) 31, 32. The LAN controller 21 is connected via a network 1 to the printers 31, 32. In this example, the controller 100 constitutes a first device monitoring apparatus, the LAN controller 21 constitutes a second device monitoring apparatus, and printers (SFPs) 31, 32 constitute object devices to be monitored. The second device monitoring apparatus is an example processing apparatus in this invention.

The MFP 11 is a multi functional peripheral having a device monitoring function, an original scanning function, a print function, a box function, and a facsimile transmission function.

The controller 100, which is a device monitoring apparatus, transmits an information acquisition request (polling) to the printers 31, 32, etc. on the network 1, and monitors information thereon and state thereof for management. The controller 100 is able to process image data supplied from the scanner 200, etc., transmit the processed image data to the printer 300 for printing, and generate and transmit a PDL file. The device monitoring apparatus can be constituted by an information processing apparatus having a device monitoring function such as a personal computer or a server.

The LAN controller 21, which is a device monitoring apparatus, transmits an information acquisition request (polling) to the printers 31, 32, etc. on the network 1, and monitors information thereon and state thereof for management. The LAN controller 21 transmits and receives an image file or other data or a mail to and from the controller 100 via an internal bus. In the example shown in FIG. 1, an LAN controller is constituted by the LAN controller 21 incorporated in the MFP 11, but may be constituted by another apparatus on the network 1 such as, for example, a PC or other information terminal.

The printers 31, 32, which are printer apparatuses, are apparatuses called single function peripherals having a print function. The printers 31, 32 are output apparatuses each having a network interface through which print data or image data is received and adapted to perform printing on sheets, etc. by using electrophotographic technique or other known printing technique.

In this example, the system includes the printers 31, 32 which are on the network 1, but may include one or more printers which are not on the network 1 or may include other apparatus on the network 1 such as a personal computer or other information terminal.

In an environment including the above described system configuration, several methods for managing apparatuses on a network are standardized by the international organization for standardization (ISO). A model called the open system interconnection (OSI) model is constituted, in which required functions of a computer or other communication apparatus are divided into a hierarchical structure.

An SNMP (simple network management protocol) corresponding to the seventh layer or the application layer in the OSI reference model is a protocol for system management on the Internet. With this standardized protocol, information can be collected from an apparatus and used for monitoring and controlling the apparatus.

With an SNMP-based network management technology, a network management system includes at least one network management station (NMS). The system also includes a management station and several managed object nodes each including an agent and includes a network management protocol used by the agent for management information exchange.

A user is able to obtain and change data on the network by communicating with agent software on the managed object nodes with use of network management software on the NMS.

The agent is software that operates as a background process on target apparatuses. When the user requests any of the apparatuses on the network to transmit management data, the network management software delivers a management packet or frame including object identification information to the agent of the target apparatus. The agent interprets the object identification information, takes out data corresponding to the object identification information, incorporates the data into a packet, and sends the packet back to the user. The agent holds data on its own state in the form of a database called an MIB (management information base).

The agent is implemented, for example, on a network board for connecting the printers 31, 32 which are printer apparatuses with the network, whereby the printers 31, 32 can be made an object of management by the network management software.

By using, e.g., the network management software currently executed on the controller 100 of the device monitoring apparatus (MFP) 11, the user is able to acquire or change information on the printers 31, 32 which are the controlled objects. In a case, for example, that a jam takes place in the printer 31, error information can be acquired from the printer 31 and can be transmitted via e-mail to, e.g., a predetermined manager's information terminal device (not shown).

Construction of the Device Monitoring Apparatus (A) Construction of the Controller 100

Next, the construction of the controller 100 as the device monitoring apparatus is described.

As shown in FIG. 1, the controller 100 is connected on one hand to a scanner 200 as an image input apparatus and the printer 300 as an image output apparatus, and connected on the other hand to networks such as a public line 12 and a LAN 13, whereby the controller 100 is able to input and output image information and device information.

The controller 100 includes a CPU 103, a RAM 107, a ROM 108, an HDD 109, an operation unit I/F 104, and a network I/F 105, which are on a system bus 101.

The CPU 103 functions as a controller that controls the entire MFP 11, and executes a device monitoring application which is software by which this embodiment is characterized. The details of the device monitoring application will be described later. The RAM 107 is a system work memory used by the CPU 103 for its operation and also used as an image memory for temporal storage of image data. The ROM 108 is used as a boot ROM in which a boot program for the MFP 11 is stored.

The HDD 109 is a hard disk drive for storing system software, image data, and personal data such as an address book, and for storing program codes of the device monitoring application, a table used for management of devices to be monitored (hereinafter referred to as the monitored object devices), and information acquired from the monitored object devices, by which this embodiment is characterized. Image data is encoded by the later mentioned image compression unit 115 and stored. When used, image data is decoded. In the case of an apparatus not provided with a hard disk drive, image data is stored in other storage medium such as a flash memory.

The operation unit I/F 104 is an interface section with an operation unit 400, outputs image data to the operation unit 400 on which the image data is displayed, and conveys information input by the user via the operation unit 400 to the CPU 103.

The network I/F 105 is connected to the LAN 13 via the LAN controller 21, and inputs and outputs information from and to apparatuses on the network 1. The details of the LAN controller 21 will be described later. A modem 106 is connected to the public line 12 and performs modulation and demodulation processing for data transmission and reception.

An image bus I/F 110, which is a bus bridge for data structure conversion, connects the system bus 101 with an image bus 102 for high-speed transmission of image data. The image bus 102 is constituted by a PCI bus or a high-speed bus such as IEEE 1394.

A raster image processor (accelerator) 111, a device I/F unit 112, a scanner image processing unit 700, a printer image processing unit 800, and an image compression unit 115 are on the image bus 102.

The accelerator 111 decompresses PDL codes into a bit map image. The device I/F unit 112 connects the controller 100 with the scanner 200 and the printer 300 which are image input and output devices, and performs a synchronous/asynchronous system conversion. The image compression unit 115 performs compression/decompression processing on image data. The image data to be compressed or decompressed is read out from the HDD 109, and the compressed or decompressed data is stored again in the HDD 109.

A power control unit 500 supplies electric power from a power supply (not shown) to the controller 100, the scanner 200, the printer 300, and the LAN controller 21. The power control unit 500 is provided with four systems of power supply line. Three of the four systems are saving power lines (saving power lines 501 to 503), and one of which is an all night power line (all night power line 504). In accordance with, for example, a control signal from the controller 100 or the LAN controller 21, power supply from the saving power lines 501 to 503 can be made ON/OFF. When the controller 100, the scanner 200, and the printer 300 are in a standby state for a given time period and are instructed by the controller 100 to shift to a power saving mode, the power supply from the saving power lines 501 to 503 is stopped.

The scanner image processing unit 700 performs correction, modification, and editing on input image data. The printer image processing unit 800 performs printer corrections, resolution conversion, etc. on print out image data.

(B) Construction of the LAN Controller 21

Next, the construction of the LAN controller 21 is described with reference to FIG. 2.

Figure 2:
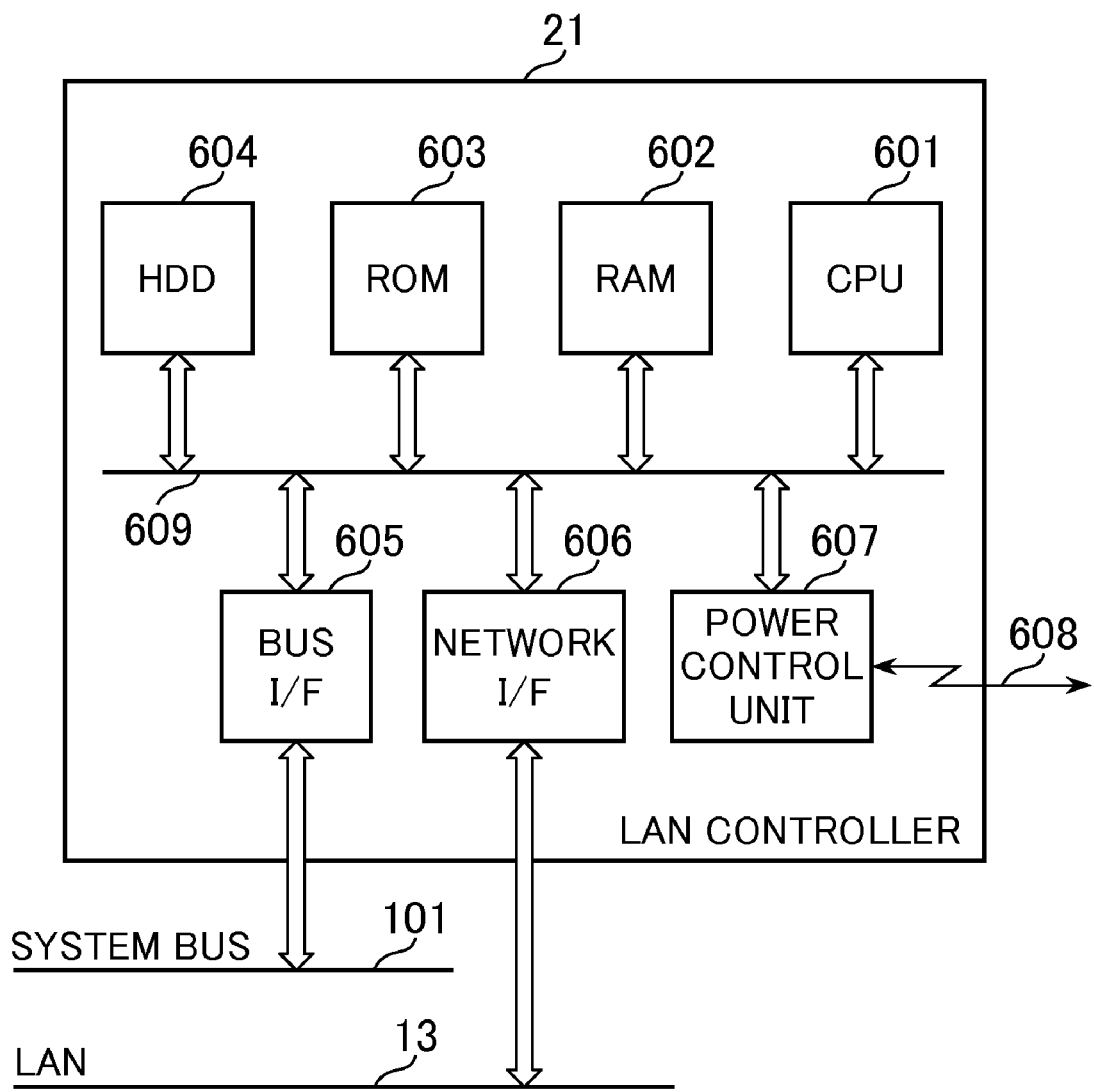
FIG. 2 is a block diagram showing the construction of a LAN controller in FIG. 1.

FIG. 2 shows in block diagram the construction of the LAN controller 21 in FIG. 1.

The LAN controller 21 includes a CPU 601, a RAM 602, a ROM 603, an HDD 604, a bus I/F 605, a network bus I/F 606, and a power control unit 607.

The CPU 601 functions as a controller for controlling the entire LAN controller 21. The CPU 601 transmits interruption to and receives an instruction from the controller 100 via a local bus 609, the bus I/F 605, and the system bus 101, whereby bidirectional communication is performed between the CPU 601 and the controller 100. The CPU 601 is connected to the LAN 13 via the local bus 609 and the network bus I/F 606, and controls data transmission to and data reception from printers and information processing terminals on the LAN 13 or on the network 1. When the controller 100 is in a sleep state, the CPU 600 performs processing on particular network access to the controller 100. For example, the CPU 600 acts as a proxy to broadcast polling and starts power supply to the controller 100 for a print job in accordance with a power control signal 608.

The RAM 602 is a system work memory used by the CPU 601 for its operation and also used as a buffer memory for temporal storage of data to be transferred to the network. The ROM 603 is used as a boot ROM in which a boot program from the LAN controller 21 is stored.

The HDD 604 is a hard disk drive for storing system software, transfer data, etc., and for storing a program for implementing device monitoring by which this embodiment is characterized. In some cases, pieces of information on image output speed, installation positions, etc. present in MIB with regard to nodes connected to the network 1 are stored in the HDD 604 for every IP address.

The bus I/F 605 is a bus interface that connects the local bus 609 with the system bus 101 of the controller 100. The network bus I/F 606 is a bus interface that connects the local bus 609 with the LAN 13. The power control unit 607 and the power control signal 608 are adapted to control the power control unit 500 of the MPP 11.

The local bus 609 is a system bus to which are connected various processing sections of the LAN controller 21 such as the CPU 601.

(C) Device Monitoring Application

Next, a description is given of a device monitoring application.

The device monitoring application is software that operates on the controller 100 or the LAN controller 21, which is a device monitoring apparatus. The user registers network IP addresses or MAC addresses of monitored object devices. These entries are stored in the form of a table (device monitoring table) into a storage device such as a RAM or an HDD.

Figures 3, 4:
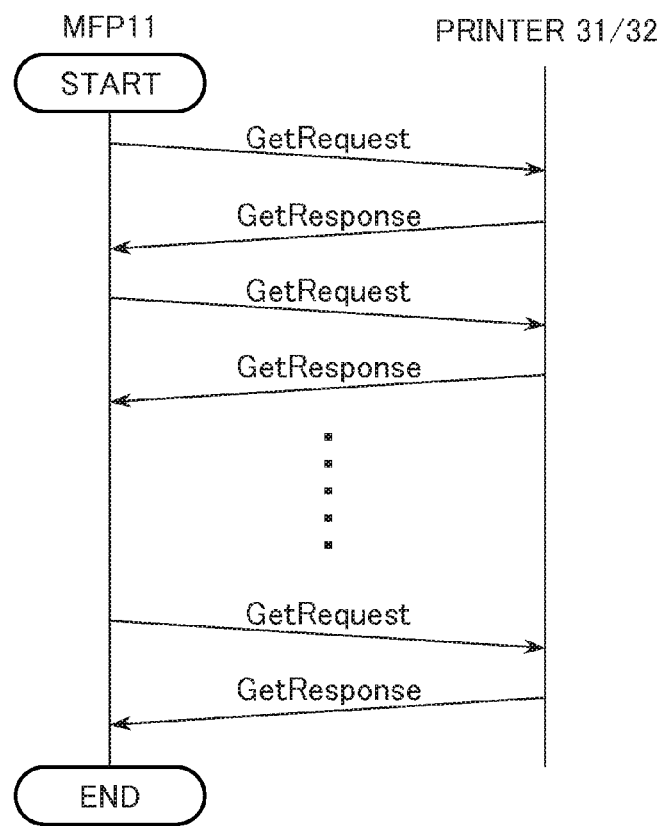
FIG. 3 is a sequence diagram showing communications between the device monitoring apparatus and a monitored object device at normal polling.
FIG. 4 is a tabulated diagram showing a device monitoring table according to the first embodiment.

Upon completion of the registration setting by the user, the device monitoring apparatus starts a device monitoring operation. For example, as shown in FIG. 3, the MFP 11, which is a device monitoring apparatus, performs processing to transmit an information acquisition request (GetRequest) to the printer 31 and receive and store a response (GetResponse) from the printer 31. Upon each elapse of a predetermined time period from when all the requested information are stored, the MFP 11 restarts the processing. It should be noted that FIG. 3 is a sequence diagram showing communications between the device monitoring apparatus and the device to be monitored at normal polling, and the communications are implemented by using an SNMP, for example.

As described above, the device monitoring apparatus acquires information from devices as monitored objects and stores the acquired information in its storage device by executing the device monitoring application. The device monitoring apparatus is able to manage devices such that it transmits an error message to a manager in accordance with a state of each monitored object device based on the acquired information.

Process Implemented by the Device Monitoring System

Next, a description is given of a device monitoring process implemented by the device monitoring system having the above described construction.

When the printers 31, 32 shift into a sleep state while the states of the printers 31, 32 as monitored objects are being monitored by the controller 100, the device monitoring application on the LAN controller 21 is made effective, whereas the device monitoring application on the controller 100 is made ineffective.

Subsequently, when either one of the printers 31, 32 returns from the sleep state to a normal state, the LAN controller 21 issues an interruption to the controller 100. When receiving the interruption, the controller 100 makes the device monitoring application on the LAN controller 21 ineffective, and makes the device monitoring application on the controller 100 effective.

In the following, the details of the device monitoring process of this embodiment are described with reference to FIGS. 4 to 9. FIG. 4 shows in table diagram a device monitoring table according to the first embodiment.

The controller 100 is provided with the device monitoring table shown in FIG. 4, and registers monitored object devices in the device monitoring table. Prior to execution of the device monitoring application, the printers (SFPs) 31, 32 are registered as monitored object devices in the device monitoring table. For example, as shown in FIG. 4, network IP addresses and MAC addresses of the printers (SFPs) 31, 32 are registered in the device monitoring table. The device monitoring table is provided with regions in each of which a state level of the corresponding printer is stored. The state level is information that indicates whether or not a response can be made to an information acquisition request from the controller 100. After the shift into the sleep mode or the power-off state, the printers 31, 32 as monitored objects do not respond to the information acquisition request from the controller 100. Based on this fact, the state level is judged.

After the preparation of the device monitoring table, the controller 100 executes a program for controlling the device monitoring application.

(A) Operation of the Controller 100

Next, the operation of the controller 100 of the MFP 11 of this embodiment is described with reference to FIGS. 5 and 6.

FIGS. 5 and 6 show in flowchart a device monitoring process implemented by the controller 100 of the first embodiment. The device monitoring process is implemented by the CPU 103 of the controller 100 by executing the program for controlling the device monitoring application.

The controller 100 waits for elapse of a polling interval time period (S101). Upon elapse of the polling interval time period, the controller 100 selects either one of the printers 31, 32 as a monitored object device from the device monitoring table (S102).

If, for example, the printer 31 is selected as the monitored object device in S102, the controller 100 detects whether or not the printer 31 as the monitored object is in a state able to respond to the information acquisition request (i.e., whether or not the printer 31 is not in the sleep mode or the power-off state), by referring to the state level content in the device monitoring table (S103).

If the printer 31 as the monitored object is in a state able to respond to the information acquisition request (YES to S103), the controller 100 carries out normal polling in which packet transmission and reception are repeated plural times, as shown in FIG. 3, for acquisition of information on the printer 31 (S104). In the normal polling, the controller 100 transmits a request packet for acquisition of status information and MIB information. The request packet is an example of a first information acquisition request in this invention.

The request packet generated by the controller 100 for acquisition of MIB information varies depending on a type of the monitored object device. In a case, for example, that the printer 31 is of a type able to determine private MIB information, an information acquisition packet is generated and transmitted in which an object identifier for private MIB is set. In a case that the printer 31 is of other type, a packet for acquisition of standard MIB is generated and transmitted.

Thus, the information acquisition request in the normal polling is a request for acquisition of a value from a database such as a predetermined standard MIB or an arbitrary private MIB.

If the printer 32 is selected as the monitored object device in S102 and if it is determined in S103 that the printer 32 is in an unrespondable state such as a sleep state, the controller 100 generates and transmits a packet for execution of simple polling (second information acquisition request (see, FIG. 7)) simpler than the normal polling (S105). The simple polling is an information acquisition request for acquisition of information more limited than information acquired by the normal polling.

FIG. 7 shows, in sequence diagram, communication between the device monitoring apparatus and the device to be monitored at the simple polling. In the simple polling, transmission and reception of an arbitrary single packet (for example, a status information request packet) is implemented using, e.g., SNMP. The information acquisition request in the simple polling is a request for acquisition of a value from a part of a database such as a predetermined standard MIB or an arbitrary private MIB.

After the packet transmission, the controller 100 waits for a response from the transmission destination device for a predetermined time period. If a response is received (NO to S106), the controller 100 sets the state level in the device monitoring table to one allowing execution of the normal polling (respondable state) (S107), whereby the state level in the device monitoring table is made active. Subsequently, the controller 100 carries out the normal polling to repeat the transmission of an information acquisition request and the reception of a response as described with reference to FIG. 3, and stores received MIB information, etc. on the printer 31 as the monitored object into the storage device (RAM 107 or HDD 109) of the controller (S108).

Figure 8:
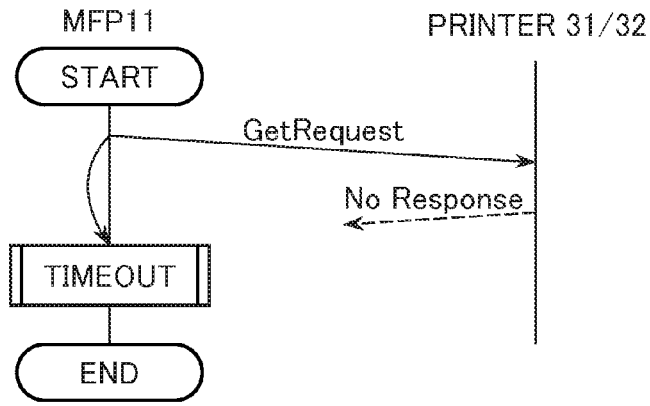
FIG. 8 is a sequence diagram showing a case where a timeout takes place during an SNMP communication at simple pooling between a device monitoring apparatus and a monitored object device.

If it is determined in S106 that no response is received from the packet transmission destination device, i.e., the monitored object device, the state level in the device monitoring table is changed to one allowing execution of the simple polling (unrespondable state) (S109). Specifically, if a timeout is detected by the controller 100 as shown in FIG. 8 upon elapse of the predetermined time period from when the packet is transmitted from the controller 100, the state level in the device monitoring table is changed to one allowing execution of the simple polling (unrespondable state). FIG. 8 is a sequence diagram showing a case where a timeout takes place during an SNMP communication between the device monitoring apparatus and the monitored object device at the simple polling.

Subsequently, the controller 100 determines based on the state levels in the device monitoring table whether or not all the monitored object devices (printers 31, 32 in this example) are in an unrespondable state in which they are to be polled by the simple polling (S110). If it is determined in S100 that not all of the monitored object devices are in the unrespondable state, the process proceeds to S111. If it is determined in S111 that there is an unselected monitored object device in the device monitoring table, the controller 100 returns to S101. If it is determined that there is no unselected device, the controller returns to S102.

If it is determined in S110 that all the monitored object devices are in the unrespondable state, the controller 100 determines that load becomes small and proceeds to S112.

In S112, the controller 100 makes the device monitoring application operating thereon ineffective, to thereby stop polling all the monitored object devices.

In S113, the controller 100 makes setting to wait for an interruption (sleep restoration notification) from the LAN controller 21. Then, the controller 100 notifies the LAN controller 21 of information on monitored object devices to be polled by the simple polling, and makes setting to enable the device monitoring application that operates on the LAN controller 21. Thus, the controller 100 stops its own polling function and instead causes the LAN controller 21 to carry out the simple polling.

Then, the controller 100 waits for an interruption from the LAN controller 21 (S114). The LAN controller 21 generates an interruption on the condition that it receives a response to the simple polling from any of monitored object devices.

In S114, when detecting an interruption from the LAN controller 21, the controller 100 makes setting to disable the device monitoring application operating on the LAN controller 21 (S115), thereby causing the LAN controller 21 to stop polling.

Next, the controller 100 makes setting to enable the device monitoring application operating on the controller 100 (S116), thereby restarting the polling, i.e., the device monitoring by the controller 100.

(B) Operation of the LAN Controller 21

Figure 9:
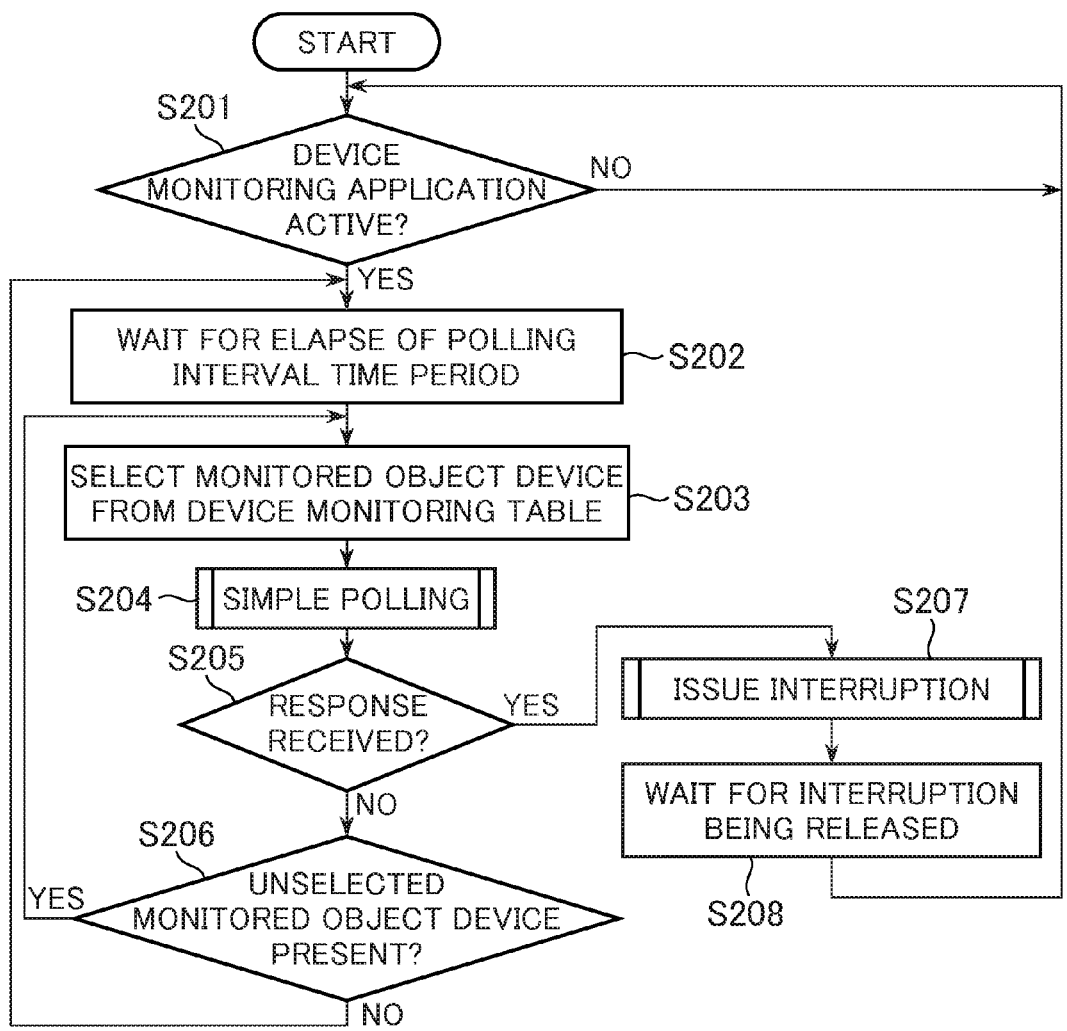
FIG. 9 is a flowchart showing an operation of a second device monitoring apparatus of the first embodiment.

FIG. 9 shows in flowchart the operation of the LAN controller 21 according to the first embodiment. The operation is implemented by the CPU 601 of the LAN controller 21 by executing a program for controlling the device monitoring application, and is carried out in conjunction with the operation of the controller 100.

Upon the LAN controller 21 being activated, the process is started. First, the LAN controller 21 determines whether or not the device monitoring application is set to be active by the controller 100 (S201).

If it is determined in S201 that the device monitoring application is set to be active, the LAN controller 21 waits for elapse of a predetermined polling interval time period (S202), and then selects a monitored object device from the device monitoring table in accordance with a notification from the controller 100 (S203).

If the printer 31 is selected in S203, the LAN controller 21 transmits a packet for executing the simple polling on the printer 31 (S204) and waits for a response from the transmission destination device until elapse of a predetermined time period from when the packet is transmitted (S205).

If a timeout is determined in S205, i.e., if no response is received, the LAN controller 21 determines whether or not there is an unselected monitored object device in the device monitoring table (S206). If there is no unselected device, the process returns to S202. Otherwise, the process returns to S203.

If a response is received in S205 from the monitored object device to which the packet has been transmitted, the LAN controller 21 issues an interruption to the controller 100 (S207) and waits for the interruption being released by the controller 100 (S208). When the interruption is released, the process returns to S201.

Advantages of the First Embodiment

According to this embodiment, the controller 100 stops monitoring in accordance with the states of monitored devices and instead causes the LAN controller 21 to perform monitoring, whereby the processing load on the entire system and power consumption can be reduced. Specifically, when all the monitored object devices are brought in an unresponable state, the controller 100 determines that the load applied thereon becomes small, stops polling the monitored object devices, and causes the LAN controller 21 to execute the simple polling. Thus, even if some monitored object devices are of a type not provided with means for notifying restoration from a sleep state, the controller 100 is able to stop polling and shift into a power saving mode after being in a standby state for a predetermined time period, if copying processing, print processing, or other job is not requested.

When the controller 100 of the MFP 11 is in a power saving mode, power is supplied to and consumed only by the LAN controller 21. Since the processing in the LAN controller 21 is simpler than in the controller 100, the device monitoring application can be implemented by a small-scaled system configuration, whereby an amount of power consumption in the whole system can be suppressed. In addition, the execution of only the simple polling can reduce load on the controller 100 and the LAN controller 21.

Second Embodiment

Some of devices has a function of issuing a sleep transition notification to a master unit at transition to a sleep mode and issuing a sleep restoration notification at restoration from the sleep mode. There is also a device of a type that restores from a sleep state when receiving an information acquisition request even if it is in the sleep state, i.e., of a type always able to respond to an information acquisition request. In the second embodiment, with reference to FIGS. 10 to 14, a description is given of a device monitoring process implemented in a case that the above described types of devices are mixedly present in the monitored object devices.

Construction of a Device Monitoring System

FIG. 10 shows in block diagram an example construction of a device monitoring system according to the second embodiment of this invention, in which like elements to those shown in FIG. 1 are denoted by like reference numerals and a description thereof will be omitted.

In this device monitoring system, printers 33, 34 as monitored object devices are added to the arrangement shown in FIG. 1, in addition to the printers 31, 32. The printers 31, 32 are examples of a first device in this invention, and the printers 33, 34 are examples of a second device in this invention.

In addition to the function of the printers 31, 32, the printers 33, 34 each have a function of issuing a sleep transition notification to the MFP 11 at transition from a normal data processing standby state to a sleep mode state and a function of issuing a sleep restoration notification to the MFP 11 at transition from the sleep mode state to the normal data processing standby state. The sleep transition notification and the sleep restoration notification will collectively be referred to as the state transition notification. On the other hand, the controller 100 has a function of identifying whether or not a monitored object device is of a type able to issue the state transition notification. The result of the identification is held in a device monitoring table, described later (see, entries "simple polling object device" in FIG. 11A).

Process Implemented by the Device Monitoring System

FIG. 11A shows the entirety of the device monitoring table according to the second embodiment, and FIG. 11B shows a relation between state levels in the device monitoring table and states of monitored object devices.

The controller 100 includes the device monitoring table shown in FIG. 11A, and registers the printers 31 to 34 as monitored object devices in the device monitoring table prior to execution of the device monitoring application. For example, IP addresses and MAC addresses are stored in the table as shown in FIG. 11A.

The controller 100 communicates with the printers 31 to 34 as the monitored object devices to thereby acquire information thereon, and then determines whether or not each of these devices is of a type able to issue the state transition notification.

Each of entries "simple polling object device" in the device monitoring table in FIG. 11A indicates whether or not the corresponding device is of a type able to issue the state transition notification. Devices of a type able to issue the state transition notification are registered as simple-polling precluded devices in the table (as indicated by X marks in FIG. 11A). In the example in FIG. 11A, the printers 33, 34 are registered as the simple-polling precluded devices in the table. Monitored object devices of other type are registered as simple-polling object devices in the table (as indicated by circle marks in FIG. 11A). In the example in FIG. 11A, the printers 31, 32 are registered as the simple-polling object devices in the table.

As previously described, there is a device of a type that restores from a sleep state when receiving an information acquisition request (for example, SNMP) even if it is in the sleep state, i.e., of a type always able to respond to an information acquisition request. Devices of this type may be registered as the simple-polling precluded devices in the device monitoring table.

Each of entries "state level" in FIG. 11A indicates, as described in detail in FIG. 11B, what processing is performed on a corresponding monitored object device.

After preparing the device monitoring table, the controller 100 ensures storage regions for storing pieces of device information and then executes a program for controlling the device monitoring application.

(A) Operations of the Controller 100

Next, operations of the controller 100 of the MFP 11 according to this embodiment are described.

With reference to FIG. 12, a description is given of a monitored object setting process in which devices to be monitored are registered by the controller 100 in the device monitoring table.

FIG. 12 shows in flowchart the monitored object setting process implemented by the controller 100 according to the second embodiment.

At start of the monitored object setting process, the controller 100 searches for monitored object devices on the network (S301) and determines whether or not there are one or more monitored object devices. If no device is found (S302), the process is completed.

If one or more monitored object devices are found in step S302, the controller 100 makes access to each of one or more devices selected by a manager and acquires information on each device (S303).

Next, the controller 100 determines based on the acquired information whether or not each of the one or more selected devices is of a type able to issue a state transition notification (S304), and registers each of one or more devices determined in S304 as being capable of issuing a state transition notification as a simple-polling precluded device into the device monitoring table (S305). In this embodiment, it is assumed that the printers 33, 34 in FIG. 10 are registered as simple-polling precluded devices.

On the other hand, the controller 100 registers each of one or more devices determined in S304 as being incapable of issuing a state transition notification as a simple-polling object device into the device monitoring table (S306). In this embodiment, it is assumed that the printers 31, 32 in FIG. 10 are registered as simple-polling object devices.

After completion of the monitored object setting process, the controller 100 starts a device monitoring process.

Figure 13:
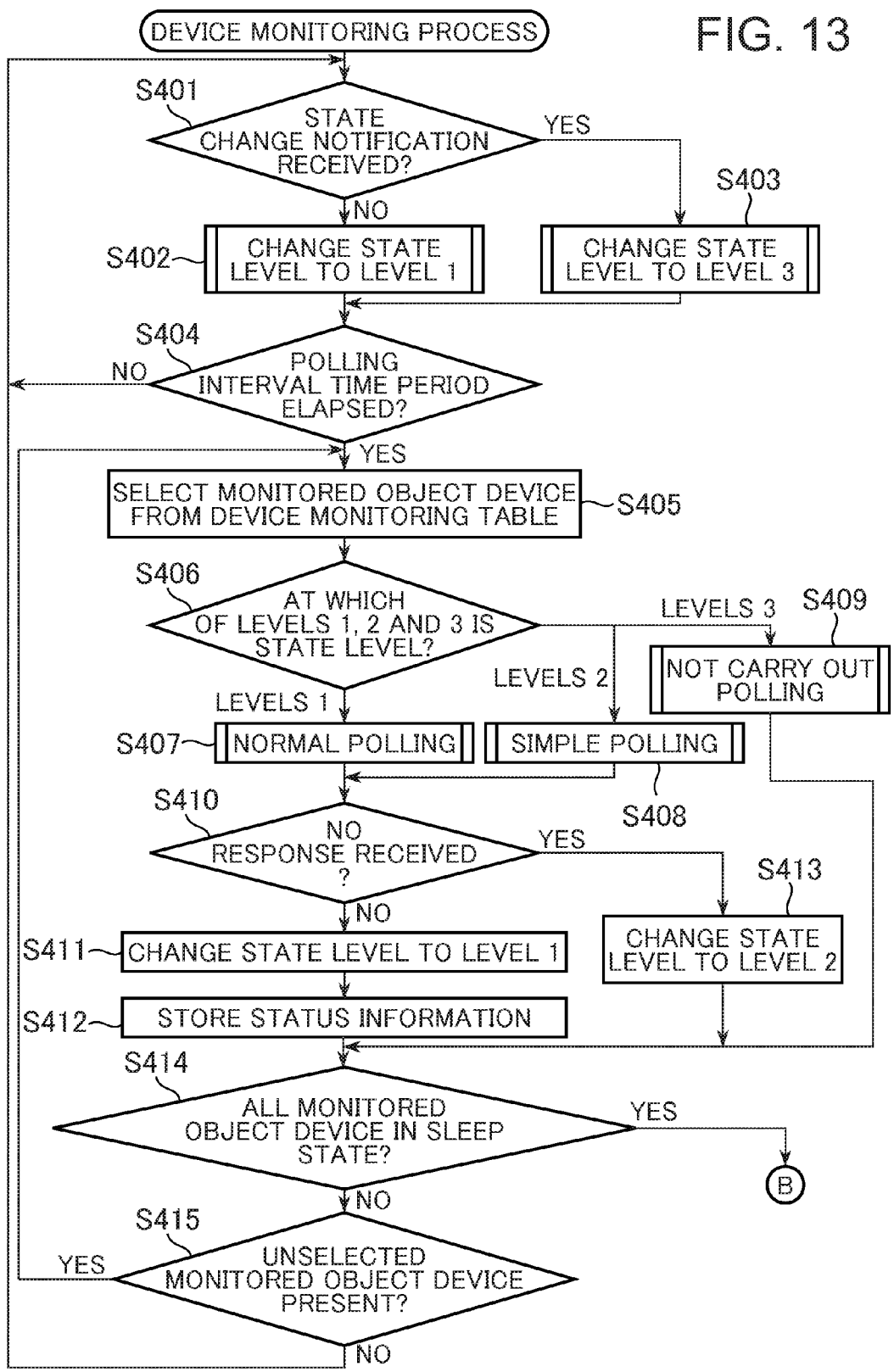
FIG. 13 is part of a flowchart showing a device monitoring process implemented by the first device monitoring apparatus of the second embodiment.
Figure 14:
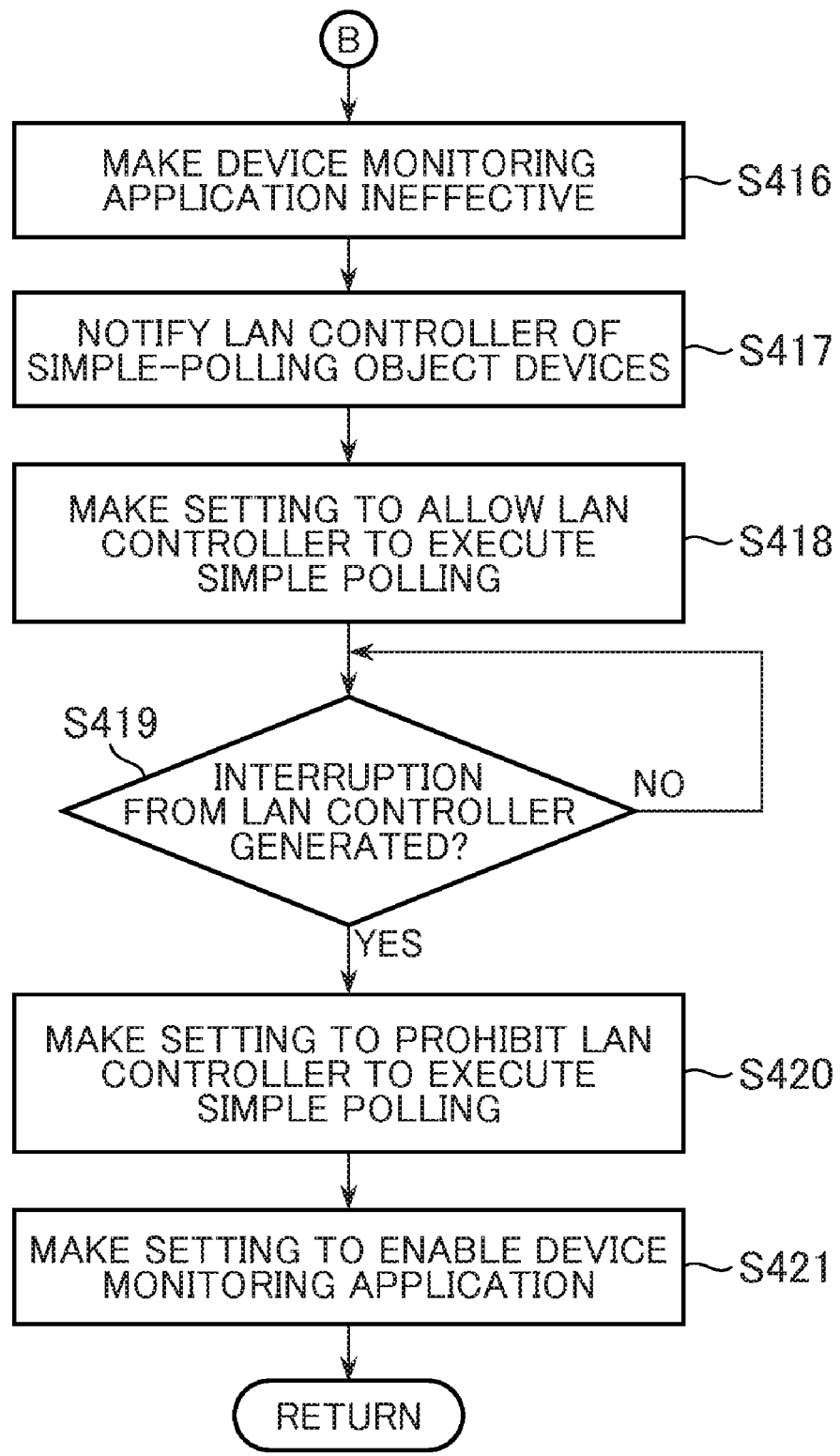
FIG. 14 is the remaining part of the flowchart, which follows the part shown in FIG. 13.

With reference to FIGS. 13 and 14, the device monitoring process implemented by the controller 100 of this embodiment is described.

FIGS. 13 and 14 shows in flowchart the device monitoring process implemented by the controller 100 of the second embodiment. The device monitoring process is implemented by the CPU 103 of the controller 100 by executing a program for controlling a device monitoring application.

First, the controller 100 determines whether or not a state change notification (sleep transition notification/sleep restoration notification or power-off notification/power-on notification) is received from a monitored object device (S401). When a sleep restoration notification or a power-on notification is received, a state level in the device monitoring table for the device from which the notification is received is changed to a value of "1" indicating that the device is in an activation state (S402).

When a sleep transition notification or a power-off notification is received from a monitored object device, the controller 100 changes a state level in the device monitoring table for the device from which the notification is received to a value of "3" indicating that the device is precluded from the simple-polling object devices (S403).

After completion of the processing in S402 or S403, the controller 100 determines whether or not a polling interval time period has elapsed (S404). If the polling interval time period has not elapsed, the process returns to S401. When the polling interval time period has elapsed, the controller 100 selects any of the printers 31 to 34, which are the monitored object devices, from the device monitoring table (S405).

Next, the controller 100 determines the state level of the monitored object device selected in S405 (S406). If it is determined in S406 that the state level of the selected monitored object device is "1" indicating the activation state, the controller 100 carries out the normal polling in which packet transmission and reception are repeated plural times as shown in FIG. 3 to acquire information on the monitored object device (S407). As with the first embodiment, the controller 100 generates a request packet for acquisition of MIB information in accordance with the device type.

If it is determined in S406 that the state level of the selected monitored object device is "2" indicating the simple polling, the controller 100 generates and transmits, as shown in FIG. 7, a packet for the simple polling on the monitored object device (S408), as with the first embodiment.

If it is determined in S406 that the state level of the selected monitored object device is "3" indicating that the device is a simple-polling precluded device, the controller 100 does not carry out polling (S409) and proceeds to S414. Thus, if a sleep transition notification or a power-off notification is issued from a monitored object device to the controller 100, the state level for the device in the device monitoring table is set to "3" indicating that the device is a simple-polling precluded device, and polling is not performed on that device.

The controller 100 waits for a response from the transmission destination device, i.e., the monitored object device, until elapse of a predetermined time period from the packet transmission in S407 or S408 (S410).

If a response is received in S410, the controller 100 changes the state level in the device monitoring table to "1" indicating an activation state (S411), and stores information from the monitored object device in a storage device in the controller 100 (S412). On the other hand, if no response is received in S410, the controller 100 sets the state level in the device monitoring table to "2" indicating permission of the simple polling (S413). After completion of the processing in S412 or S413, the process proceeds to S414.

In S414, the controller 100 determines whether or not all the monitored objects are at a level of "2" (simple polling) or "3" (precluded from simple polling) based on the state levels in the device monitoring table, to thereby determine whether or not all the monitored object devices are in the sleep state or in the power-off state.

If it is determined in S414 that there is a monitored object device at the state level of "1" (activation state) in the device monitoring table, the controller 100 determines whether or not there is an unselected monitored object device in the device monitoring table (S415). The process returns to S401 if there is no unselected monitored object device, and returns to S405 if there is an unselected monitored object device.

On the other hand, if it is determined in S414 that all the monitored object devices are in the sleep state or in the power-off state, the controller 100 determines that load applied thereon becomes small and proceeds to S416.

In S416, the controller 100 disables the device monitoring application that operates on the controller 100. As a result, the controller 100 stops polling all the monitored object devices. In the next step S417, the controller 100 makes setting to wait for an interruption from the LAN controller 21. Then, the controller 100 notifies the LAN controller 21 of information indicating the monitored object devices to be subjected to the simple polling (e.g., printers 31, 32 in this example) and information indicating the monitored object devices which have to wait for being restored from the sleep state (e.g., printers 33, 34 in this example). In the next step S418, the controller 100 makes setting to enable the device monitoring application operating on the LAN controller 21.

As described above, the controller 100 is able to make the setting to cause the LAN controller 21 to perform the simple polling only on the monitored object devices to be subjected to the simple polling.

Then, the controller 100 waits for an interruption from the LAN controller 21 (S419). The LAN controller 21 generates an interruption on the condition that it receives a response from any of the monitored object devices to the simple polling or receives a sleep restoration notification from any of the monitored object devices, notified in S417 to the LAN controller 21 that these devices are ones that have to wait for being restored from the sleep state.

If detecting in S419 an interruption from the LAN controller 21, the controller 100 makes setting to disable the device monitoring application operating on the LAN controller 21 (S420). Then, the controller 100 enables the device monitoring application operating thereon (S421) and restarts the operation from S401.

(B) Operation of the LAN Controller 21

As described above, the condition for generation of an interruption by the LAN controller 21 is fulfilled not only when a response to the simple polling is received from any of monitored object devices, but also when a sleep restoration notification is received from any of monitored object devices which have to wait for being restored from sleep state. In other respects, the operation of the LAN controller 21 of this embodiment is similar to that of the LAN controller 21 of the first embodiment.

Advantages of the Second Embodiment

According to this embodiment, in the monitored object setting process, monitored object devices of a type able to issue a state transition notification or of a type able to always respond to an information acquisition request from an external apparatus are registered as ones to be precluded from the simple polling in the device monitoring table. As a result, it is possible to execute the device monitoring similar to that in the first embodiment, even in a system in which devices able to issue a state transition notification and devices able to always respond to an information acquisition request are mixed.

It is to be understood that the present invention may also be accomplished by supplying a system or an apparatus with a storage medium in which a program code of software, which realizes the functions of the above described embodiments is stored and by causing a computer (or CPU or MPU) of the system or apparatus to read out and execute the program code stored in the storage medium.

In that case, the program code itself read from the storage medium realizes the functions of the above described embodiments, and therefore the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-127390, filed May 14, 2008, which is hereby incorporated by reference herein in its entirety.

What is claimed is:

1. A device monitoring apparatus that transmits a first information acquisition request to a device on a network and monitors a state of the device based on a response therefrom, comprising:

a determination unit configured to determine a state of the device to be monitored;

a stop unit configured, when said determination unit determines that the device to be monitored is in a particular state, to stop transmitting the first information acquisition request to the device;

a first instruction unit configured, when said determination unit determines that the device to be monitored is in a particular state, to instruct a processing apparatus on the network to start transmitting to the device a second information acquisition request, wherein the second information acquisition request is a request for acquiring information more limited than information acquired by transmission of the first information acquisition request;

a second instruction unit configured, when the device in the particular state shifts into another state, to instruct cause the processing apparatus to stop transmitting the second information acquisition request to the device;

a restart unit configured, when the device in the particular state shifts into another state, to restart transmitting the first information acquisition request to the device; and wherein the first information acquisition request is a request to acquire a value from a database including a predetermined standard MIB and an arbitrary private MIB, and the second information acquisition request is a request to acquire a value from a part of the database.

2. The device monitoring apparatus according to claim 1, wherein said determination unit determines that the device is in the particular state in a case where said determination unit does not receive a response until elapse of a predetermined time period from when the first information acquisition request is transmitted to the device.

3. The device monitoring apparatus according to claim 1, including:

a unit configured, in a case where said determination unit determines that a device among a plurality of devices is in the particular state, to issue the second information acquisition request to the device determined to be in the particular state.

4. The device monitoring apparatus according to claim 1, including:

a table configured to store information indicating states of the device to be monitored, wherein said determination unit determines the state of the device based on the information stored in said table.

5. A device monitoring system in which an information acquisition request is transmitted from a first device monitoring apparatus or a second device monitoring apparatus on a network to a device on the network, and the device is monitored based on a response therefrom, wherein the first device monitoring apparatus comprises:

a determination unit configured to determine a state of the device to be monitored;

a stop unit configured, when said determination unit determines that the device to be monitored is in a particular state, to stop a first information acquisition request to the device:

a first instruction unit configured, when said determination unit determines that the device to be monitored is in a particular state, to instruct the second device monitoring apparatus to start transmitting to the device a second information acquisition request, wherein the second information acquisition request is a request for acquiring information more limited than information acquired by transmission of the first information acquisition request;

a second instruction unit configured, when the device in the particular state shifts into another state, to instruct the second device monitoring apparatus to stop transmitting the second information acquisition request to the device; and a restart unit configured, when the device in the particular state shifts into another state, to restart transmitting the first information acquisition request to the device, wherein the second device monitoring apparatus comprises a unit configured to transmit the second information acquisition request to the device in accordance with an instruction from the first device monitoring apparatus according to the first instruction unit and adapted to issue the interruption notification to at least the first device monitoring apparatus when detecting a state change in the device from a response from the device; and wherein the first information acquisition request is a request to acquire a value from a database including a predetermined standard MIB and an arbitrary private MIB, and the second information acquisition request is a request to acquire a value from a part of the database.

6. A control method for a device monitoring apparatus that transmits a first information acquisition request a device on a network and monitors a state of the device based on a response therefrom, the control method comprising:

a determination step of determining a state of the device to be monitored; a stop step of stopping the first information acquisition request to the device;

a first instruction step of, when said determination step determines that the device to be monitored is in a particular state, instructing a processing apparatus on the network to start transmitting to the device a second information acquisition request, wherein the second information acquisition request is a request for acquiring information more limited than information acquired by transmission of the first information acquisition request when it is determined in said determination step that the device to be monitored is in a particular state;

a second instruction step of, when the device in the particular state shifts into another state, instructing the processing apparatus to stop transmitting the second information acquisition request to the device;

a restart step of, when the device in the particular state shifts into another state, restarting transmission of the first information acquisition request to the device; and wherein the first information acquisition request is a request to acquire a value from a database including a predetermined standard MIB and an arbitrary private MIB, and the second information acquisition request is a request to acquire a value from a part of the database.

7. A non-transitory computer-readable recording medium storing a program for causing a computer to execute a control method for a device monitoring apparatus that transmits a first information acquisition request a device on a network and monitors a state of the device based on a response therefrom, the control method comprising:

a determination step of determining a state of the device to be monitored;

a stop step of stopping the first information acquisition request from to the device;

a first instruction step of, when said determination step determines that the device to be monitored is in a particular state, instructing a processing apparatus on the network to start transmitting to the device a second information acquisition request, wherein the second information acquisition request is a request for acquiring information more limited than information acquired by transmission of the first information acquisition request when it is determined in said determination step that the device to be monitored is in a particular state;

a second instruction step of, when the device in the particular state shifts into another state, instructing the processing apparatus to stop transmitting the second information acquisition request to the device;

a restart step of, when the device in the particular state shifts into another state, restarting transmission of the first information acquisition request to the device; and wherein the first information acquisition request is a request to acquire a value from a database including a predetermined standard MIB and an arbitrary private MIB, and the second information acquisition request is a request to acquire a value from a part of the database.

8. The device monitoring apparatus according to claim 1, wherein the particular state is either one of a sleep state and a power-off state.

9. The device monitoring apparatus according to claim 1, wherein the particular state is a state in which the device cannot respond to the first information acquisition request.

10. The device monitoring apparatus according to claim 1, wherein the processing apparatus is a network controller incorporated in the monitoring apparatus.

11. The device monitoring apparatus according to claim 1, further comprising a receiving unit adapted to receive notification indicating that the device in the particular state shifts into another state, wherein said second instruction unit instructs the processing apparatus to stop transmitting the second information acquisition request to the device based on the notification received by said receiving unit whether or not the device in the particular state shifts into another state, wherein said restart unit restarts transmitting the first information acquisition request to the device based on the notification received by said receiving unit whether or not the device in the particular state shifts into another state.

* * * * *